(12) United States Patent
Huang et al.

(10) Patent No.: US 11,989,419 B2
(45) Date of Patent: May 21, 2024

(54) STORAGE DEVICE WRITE PERFORMANCE IN REMOTE COMPUTING ENVIRONMENTS

(71) Applicant: VMware, Inc., Palo Alto, CA (US)

(72) Inventors: Weigang Huang, Beijing (CN); Yueting Zhang, Beijing (CN)

(73) Assignee: VMware LLC, Palo Alto, CA (US)

( * ) Notice: Subject to any disclaimer, the term of this patent is extended or adjusted under 35 U.S.C. 154(b) by 10 days.

(21) Appl. No.: 17/814,942

(22) Filed: Jul. 26, 2022

(65) Prior Publication Data
US 2024/0012566 A1   Jan. 11, 2024

(30) Foreign Application Priority Data

Jul. 8, 2022   (WO) ................ PCT/CN2022/104626

(51) Int. Cl.
*G06F 3/06* (2006.01)
(52) U.S. Cl.
CPC .......... *G06F 3/0613* (2013.01); *G06F 3/0655* (2013.01); *G06F 3/0664* (2013.01); *G06F 3/067* (2013.01)
(58) Field of Classification Search
None
See application file for complete search history.

(56) References Cited

U.S. PATENT DOCUMENTS

| | | | |
|---|---|---|---|
| 7,082,598 B1 | 7/2006 | Le et al. | |
| 7,478,180 B1 | 1/2009 | Li | |
| 8,010,630 B2 | 8/2011 | Barreto et al. | |
| 9,397,944 B1* | 7/2016 | Hobbs | H04L 47/522 |
| 9,582,444 B1 | 2/2017 | Kumar et al. | |
| 2006/0282618 A1* | 12/2006 | Thompson | G06F 12/0804 711/E12.04 |
| 2010/0161863 A1 | 6/2010 | Cota-Robles et al. | |
| 2015/0220467 A1 | 8/2015 | Jin et al. | |
| 2016/0179565 A1 | 6/2016 | Chen | |
| 2016/0210060 A1* | 7/2016 | Dreyer | G06F 3/0659 |
| 2017/0180516 A1 | 6/2017 | Chauhan et al. | |
| 2018/0232293 A1 | 8/2018 | Petrick et al. | |
| 2020/0252472 A1 | 8/2020 | Vajravel et al. | |
| 2022/0066812 A1 | 3/2022 | Du | |

FOREIGN PATENT DOCUMENTS

CN   110268380 A  *  9/2019  ............... G06F 1/28

* cited by examiner

*Primary Examiner* — Brian R Peugh
(74) *Attorney, Agent, or Firm* — Kim & Stewart LLP

(57) ABSTRACT

The disclosure provides an approach for storage device write performance improvement in a remote computing environment. Embodiments include creating, on a remote device that is remote from a client device, a virtual storage device corresponding to a physical storage device physically connected to the client device. Embodiments include receiving, by a driver on the remote device, a request from an application on the remote device to perform a write operation with respect to the virtual storage device. Embodiments include sending, by the remote device, a write operation to the client device based on the request. Embodiments include prior to receiving a confirmation from the client device that the write operation was received or completed, sending, by the driver, to the application, a message indicating that the write operation is complete. Embodiments include receiving, by the driver, based on the message, an additional request to perform an additional write operation.

20 Claims, 5 Drawing Sheets

STORAGE DEVICE WRITE PERFORMANCE IN REMOTE COMPUTING ENVIRONMENTS

CROSS-REFERENCE TO RELATED APPLICATIONS

This application claims priority to International Patent Application No. PCT/CN/2022/104626, filed Jul. 8, 2022, entitled "IMPROVING STORAGE DEVICE WRITE PERFORMANCE IN REMOTE COMPUTING ENVIRONMENTS", and assigned to the assignee hereof, the contents of each of which are hereby incorporated by reference in its entirety.

BACKGROUND

In a virtual desktop infrastructure (VDI) environment, a local client device can access and display a remote virtual or physical desktop or remote application that is running on a remote device. For instance, a virtual desktop may be hosted on a central infrastructure known as a VDI, and may be rendered on a client device using a remote display protocol. At the client device, a user may interact with the virtual desktop using peripheral devices (e.g., keyboard and mouse, pen, etc.) associated with the client device, and operating system (OS) events generated based on the user's inputs may be redirected from the client device to the remote device on which the virtual desktop is actually running.

In some cases, a storage device associated with the client device (e.g., connected to a universal serial bus (USB) interface on the client device) may be used to store data. In certain aspects, the virtual desktop or remote application on the remote device may access such data stored at a storage device at the client device. Storage input/output (I/O) requests made by the virtual desktop or remote application may be converted into USB request block (URB) requests on the remote device and sent to the client device in order to retrieve data stored on the storage device or converted into URBs on the remote device and sent to the client device in order to write date to the storage device. The client device may send requested data back to the remote device as URBs. Furthermore, the remote device will respond to each URB received from the client device with a confirmation message.

The network traffic required to transmit these URB requests and URBs between the remote device and the client device may be substantial, and may result in latency and poor performance. For example, the maximum transferring unit for USB I/O is 64 kilobytes (KB), meaning that any storage I/O operation must be broken up into a separate URB request or URB for each 64 KB of data included in the storage I/O request, which may result in a significant amount of network traffic. Any network connection issues (e.g., if the network connection is throttled or otherwise operates at a reduced speed) may result in further decreased performance. Such poor storage I/O performance may significantly reduce the ability of a virtual desktop or other remotely-located application to function as intended. Furthermore, certain techniques for utilizing block-level I/O redirection in remote computing environments to improve performance still present certain inefficiencies, particularly in the case of write operations. For example, the delay between sending a block-level write request from a remote device to a client device and receiving a response to the write request from the client device may cause delays in initiating subsequent block-level write requests.

Accordingly, there is a need in the art for improved techniques for handling storage I/O between a virtual desktop or remote application on a remote device and a storage device associated with a client device.

It should be noted that the information included in the Background section herein is simply meant to provide a reference for the discussion of certain embodiments in the Detailed Description. None of the information included in this Background should be considered as an admission of prior art.

SUMMARY

A method of storage device write performance improvement in a remote computing environment is provided. The method includes: creating, on a remote device that is remote from a client device, a virtual storage device corresponding to a physical storage device that is physically connected to the client device; receiving, by a driver on the remote device, a request from an application on the remote device to perform a write operation with respect to the virtual storage device; sending, by the remote device, over a network, a block-level write operation to the client device based on the request; prior to receiving, by the remote device, a confirmation from the client device that the block-level write operation was received or completed, sending, by the driver, to the application, a message indicating that the block-level write operation is complete; and receiving, by the driver, based on the message, an additional request from the application to perform an additional write operation with respect to the virtual storage device.

Further embodiments include a non-transitory computer-readable storage medium storing instructions that, when executed by a computer system, cause the computer system to perform the method set forth above. Further embodiments include a computing system comprising at least one memory and at least one processor configured to perform the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
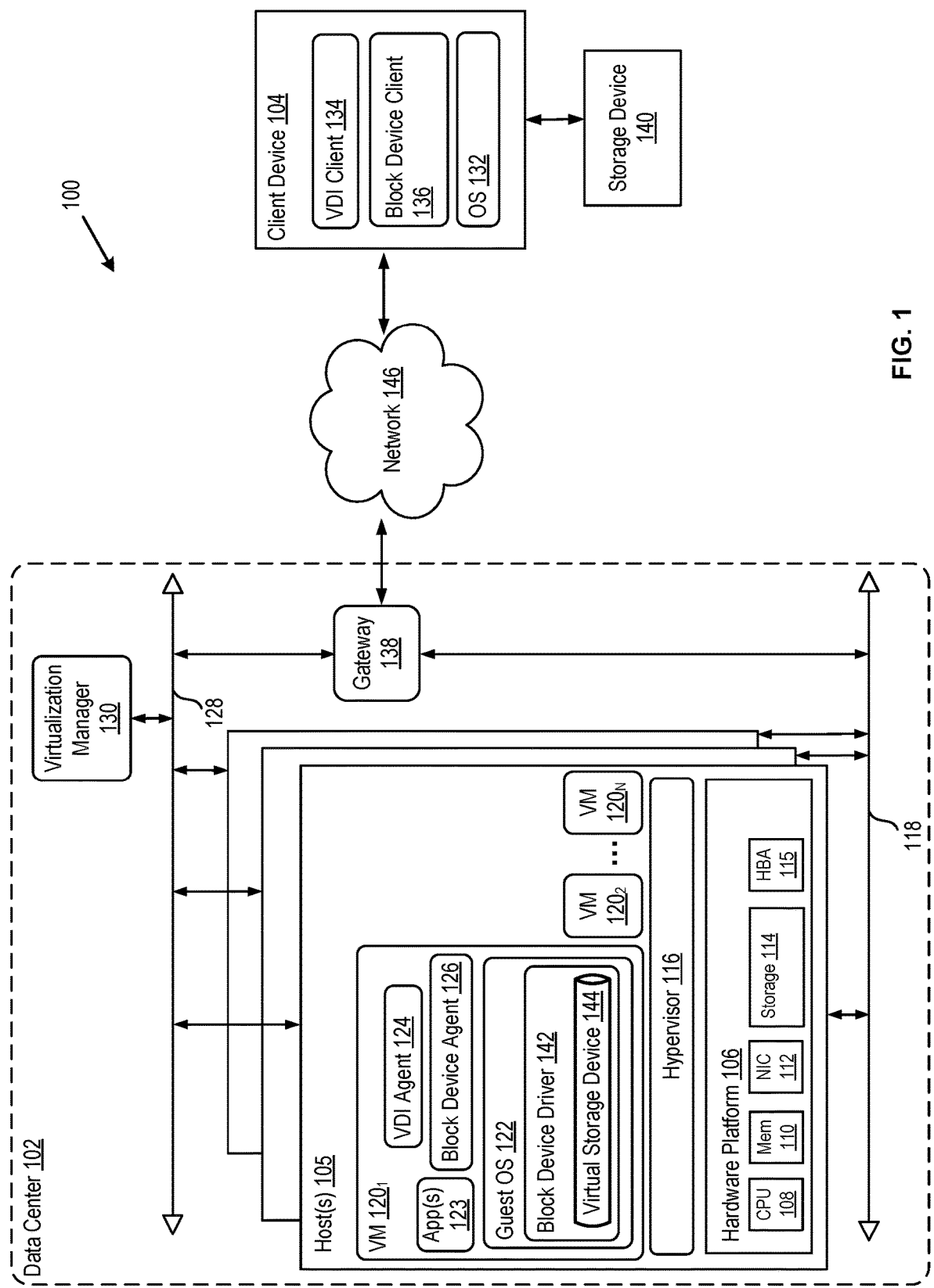
FIG. 1 depicts a block diagram of a virtualized desktop infrastructure system in which one or more embodiments according to the present disclosure may be implemented.

The present disclosure provides an approach for performance improvement in a remote computing environment. In some cases, a physical storage device connected to a client device may store data accessed by an application (e.g., virtual desktop or other application) physically connected to a remote device. As such, storage I/O operations performed by the application on the remote device with respect to the physical storage device must be redirected to the client device in order to read data from or write data to the physical storage device. Certain techniques for device redirection, such as operating system (OS) event redirection, in a VDI environment are described in more detail in U.S. patent application Ser. No. 16/444,840, the contents of which are incorporated by reference herein in their entirety.

Storage device I/O performance may be improved in remote computing environments through the use of techniques for block-level I/O redirection, as described in more detail in U.S. patent application Ser. No. 17/644,747, the contents of which are incorporated by reference herein in their entirety. In an example, a physical storage device is connected to a USB interface of a client device. A user accesses a remote application, such as a virtual desktop physically connected to a remote device, via a client application on the client device (e.g., involving communication between a VDI client and a VDI agent), and data related to the remote application is written to or read from the physical storage device connected to the client device. Rather than using conventional USB redirection techniques, a virtual storage device corresponding to the physical storage device is created on the remote machine. A virtual storage device is a virtual representation of a physical device that mimics the behavior of the physical device by receiving and responding to requests (e.g., storage I/O requests) from applications, such as based on data received from the physical device that it represents.

In certain techniques for block-level storage I/O redirection, a driver (referred to as a block device driver) is installed in a kernel of the guest operating system (OS) of a virtual computing instance (VCI) on the remote machine, and the block device driver creates a virtual storage device within the guest OS. In some cases, if the physical storage device comprises multiple partitions, the block device driver may create a virtual storage device for each partition. The block device driver maintains a mapping between the one or more virtual storage devices and the corresponding physical storage device associated with the client device. Applications on the remote device may submit storage I/O requests to a virtual storage device as if these requests were being submitted to a physical storage device, and these I/O requests may be redirected at the volume level (e.g., without first being translated through the disk, SCSI, or USB levels) to the client device.

The block device driver communicates with a block device agent on the remote device, which in turn communicates with a block device client on the client device (e.g., via a virtual channel) in order to redirect block-level I/O requests and responses to the client device. For example, a virtual channel between the remote device and the client device may be established via the block device agent and the block device client. A virtual channel is a logical communication resource between two endpoints that is allocated particular communication resources from one or more physical network interfaces associated with the two endpoints, and allows for communication between the two endpoints. The block device client initiates block-level I/O to real volume objects of the physical storage device based on the I/O requests received from the block device agent, obtains actual results from the physical storage device, and responds to the block device agent accordingly (e.g., with requested data at the block level or with an acknowledgment that a block-level write operation was successfully completed). The block device agent responds to the block device driver based on the response received from the block device client, and the block device driver in turn responds to the application accordingly (e.g., with results of the I/O operation requested by the application).

Block-level storage I/O redirection may result in a significant reduction of the number of packets sent between the remote device and the client device as compared to USB-level redirection, as each block-level I/O request/response does not need to be broken up into smaller (e.g., 64 KB) URB requests/responses before transmission over the network. Additionally, block-level I/O requests and responses may be sent between the remote machine and the client machine without URB headers. Furthermore, block-level storage I/O redirection avoids the network traffic of the three-stage process associated with each individual URB request (e.g., sending a request, receiving a response, and then sending an acknowledgment of the response).

However, techniques for block-level storage I/O redirection may still include certain inefficiencies. For instance, after sending a write request to the virtual storage device, an application on the remote device must conventionally wait to send additional write requests until the write request has been sent to the client device and the client device responds with an indication that the write request was received and/or successfully completed. This inefficiency is described in more detail below with respect to FIG. 2, and can result in notable delays between write requests.

Accordingly, techniques described herein allow an application on a remote device to submit subsequent write requests without waiting for confirmation from the client device that each successive write request has been received and/or completed. As described in more detail below with respect to FIG. 3, an application programming interface (API) that the block device agent calls to send a write request to the client device via a virtual channel may respond to the block device agent as if a response has been received from the client device prior to such a response actually being received. As such, the block device agent can respond to the block device driver as if the write request is complete, and the block device driver can respond in turn to the application indicating that the write request is complete (all without the remote device receiving any confirmation from the client device that the write request was received and/or completed). The application may then issue subsequent write requests to the virtual storage device with a significantly shorter delay than would otherwise be required if a confirmation from the client device were required for each subsequent write request.

In another embodiment, as described in more detail below with respect to FIG. 4, the block device agent responds to a write request from the block device driver with an indication that the write operation is complete without even receiving a response from the API. As such, the block device driver may send an indication to the application that the write request is complete and the application can send a subsequent write request with an even shorter delay.

If there are any issues with the virtual channel, such as a loss of connectivity between the remote device and the client device, the block device agent, the block device driver, and/or the application will be notified, and no I/O requests will be sent to the virtual storage device until such issues are resolved. As long as the virtual channel is active, there will not normally be any issues with processing of write requests when received on the client device. Thus, it can generally be assumed that a write request, once sent via the virtual channel, will be successfully completed upon receipt by the client device. If there does end up being an issue with performing the write request on the client device after the application has already proceeded with a subsequent write request as if the write request had been completed successfully, the client device may respond to the remote device with a notification of an error, and the application may, where possible, re-send the write request.

Techniques described herein improve storage device write performance in a remote computing environment by reducing delays between subsequent write requests from an application on a remote device, thereby improving the speed with which the remote device is able to write data to a storage device associated with a client device. By increasing the speed of storage device write operations in a remote computing environment, embodiments of the present disclosure improve the functioning of the computing devices involved.

It is noted that while certain examples described herein involve USB devices and URBs, techniques described herein may be employed for other types of storage devices.

FIG. 1 depicts a block diagram of a virtualized desktop infrastructure (VDI) system 100 in which one or more embodiments according to the present disclosure may be implemented. VDI system 100 comprises at least one client device 104 and a data center 102, connected by a network 146. Network 146 may be, for example, a direct link, a local area network (LAN), a wide area network (WAN) such as the Internet, another type of network, or a combination of these.

Client device 104 is a physical device, such as a general purpose desktop computer or mobile computer. A mobile computer may be, for example, a laptop, a mobile phone, or a tablet computer. Client device 104 includes VDI client 134, OS 132, and block device client 136. In certain embodiments, VDI client 134 and block device client 136 run on top of OS 132. OS 132 may be a standard, commodity operating system.

VDI client 134 is a user-side interface of a virtualized desktop running on one of virtual machines (VMs) 120. Though certain aspects are described herein with respect to a virtual desktop running on a VM, the techniques may similarly be used for a virtual desktop or application running on other types of VCIs, such as containers, or on physical computing devices. As used herein, a "virtualized desktop" or "remote desktop" is a desktop running on, for example, one of VMs 120 that is displayed remotely on client device 104, as though the remote desktop were running on client device 104. By opening VDI client 134, a user of client device 104 accesses, through network 146, a remote desktop running in remote data center 102, from any location, using client device 104. Frames of the remote desktop running on VM 120 are transmitted to VDI client 134 using a desktop delivery protocol such as VMware® Blast™ or Microsoft® Remote Desktop Protocol (RDP)™.

After transmission, the frames are displayed on client device 104 for interaction by the user. Client device 104 sends user inputs to VM 120 for processing on VM 120 of data center 102, taking processing load off client device 104. Such centralized and automated management of remote desktops provides increased control and cost savings. VDI client 134 may be, for example, VMware® View™, or a special purpose thin client such as those available from Dell, HP, NEC, Sun Microsystems, Wyse, and others.

As the user interacts with the virtual desktop, such as using a mouse and keyboard and/or other peripheral devices, the user input events may be redirected by VDI client 134 to VDI agent 124. A storage device 140 is connected to client device 104 (e.g., to a USB interface of client device 104, via another type of physical connection, via wireless connection where storage device 140 is in physical proximity to client device 104, and/or the like), and stores data accessible by VM 120, such as by the virtual desktop and/or one or more applications 123.

Block device client 136 generally performs operations related to block-level storage I/O redirection, which may involve communication with block device agent 126 over network 146. For example, a virtual channel may be established between block device client 136 and block device agent 126. In some cases, communication between block device client 136 and block device agent 126 is facilitated by VDI client 134 and VDI agent 124. In one embodiment, block device client 136 is a plugin installed in client device 104, such as within VDI client 134 or is a separate application from VDI client 134. As described in more detail below with respect to FIG. 4, block device client 136 may send a message to block device agent 126 to initiate creation of a virtual storage device on VM 120 corresponding to storage device 140. Subsequently, block device client 136 may receive block-level I/O requests from block device agent 126, and may send corresponding I/O requests to storage device 140. Block device client 136 may send results of the I/O operations to block device agent 126.

It is noted that while block device client 136 is depicted separately from VDI client 134, block device client 136 may alternatively be included within VDI client 134.

Data center 102 includes host(s) 105, a virtualization manager 130, a gateway 138, a management network 128, and a data network 118. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack.

Host 105 is configured to provide a virtualization layer, also referred to as a hypervisor 116, that abstracts processor, memory, storage, and networking resources of hardware platform 106 into multiple VMs 1201 to 120N (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine, which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. One example of a hypervisor 116 that may be used is a VMware ESXi™ hypervisor provided as part of the VMware vSphere® solution made commercially available from VMware, Inc. of Palo Alto, California.

Each VM 120 includes a guest OS 122, one or more applications 123, a VDI agent 124, and block device agent 126. Application(s) 123, VDI agent 124, and block device agent 126 run on top of guest OS 122. Guest OS 122 may be a standard, commodity operating system. An application 123 may be any software program, such as a word processing program. A block device driver 142 is installed in guest OS 122, such as in a kernel. Block device driver 142 creates a virtual storage device 144 corresponding to a physical storage device associated with client side 104 (e.g., storage device 140), such as based on information relating to the physical storage device sent from block device client 136 to block device agent 126, and then from block device agent 126 to block device driver 142. Virtual storage device 144 may emulate aspects of the physical storage device, such as allowing applications to direct storage I/O requests to the virtual storage device and then responding to these storage I/O requests with results of actually performing the requested I/O operations on the physical storage device. In some embodiments, if the physical storage device comprises multiple partitions, a separate virtual storage device may be created for each partition. Block device driver 142 may assign a drive letter to virtual storage device 144 (e.g., X), and applications may direct storage I/O requests that drive letter.

VDI agent 124 is a desktop virtualization program that connects to VDI client 134 of client device 104, through network 146. The connection between VDI agent 124 and VDI client 134 may be authenticated, such as through a username and password combination pertaining to client device 104 or to a user of client device 104. VDI agent 124 transmits, to VDI client 134, image frames of the remote desktop running on VM 120 that contains VDI agent 124. An image frame includes information on appearance of the remote desktop running on VM 120, and that information includes pixel color and location information. In addition to an image frame, VDI agent 124 may also transmit metadata of that frame to VDI client 134. The metadata may include x and y coordinate locations of a mouse cursor, x and y coordinates and size of windows of application(s) 123 open on the remote desktop, which application(s) 123 are running on and/or displayed on the remote desktop of VM 120, and other information.

Block device agent 126 interacts with block device client 136 for block-level I/O redirection. In one embodiment, block device agent 126 is a plugin installed in VM 1201, such as within VDI agent 124, or is a separate application from VDI agent 124. In certain embodiments, block device agent 126 may receive an indication from block device client 136 to initiate creation of a virtual storage device 144 corresponding to storage device 140, and interacts with block device driver 142 in the kernel of guest OS 122 to initiate creation of the virtual storage device 144. The virtual storage device 144 may be created within guest OS 122 such that applications may direct storage I/O requests to the virtual storage device 144, and the block device driver 142 may cause these requests to be redirected to client device 104. The block device driver 142 may receive results of performing the requested I/O operations on storage device 140 (e.g., from block device client 136 via block device agent 126), and respond to the requests from the applications with these results.

It is noted that while block device agent 126 is depicted separately from VDI agent 124, block device agent 126 may alternatively be included within VDI agent 124.

Hardware platform 106 of each host 105 includes components of a computing device such as one or more processors (CPUs) 108, system memory 110, a network interface 112, storage system 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 118 or network 128. Network interface 112 may include one or more network adapters, also referred to as Network Interface Cards (NICs). Storage system 114 represents persistent storage devices (e.g., one or more hard disks, flash memory modules, solid state disks, and/or optical disks). Host bus adapter (HBA) couples host 105 to one or more external storages (not shown), such as a storage area network (SAN). Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 105 via a network, shown as a management network 128, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual appliance (e.g., a VM) in one of hosts 105. One example of a virtualization manager is the vCenter Server™ product made available from VMware, Inc.

Gateway 138 provides VMs 120 and other components in data center 102 with connectivity to network 146. Gateway 138 may manage external public IP addresses for VMs 120, route traffic incoming to and outgoing from data center 102, and provide networking services, such as firewalls, network address translation (NAT), dynamic host configuration protocol (DHCP), and load balancing. Gateway 138 uses data network 118 to transmit data network packets to hosts 105. Gateway 138 may be a virtual computing instance, a physical device, or a software module running within host 105. Gateway 138 may include two gateways: a management gateway for management network 128 and a data gateway for data network 118.

Figure 2:
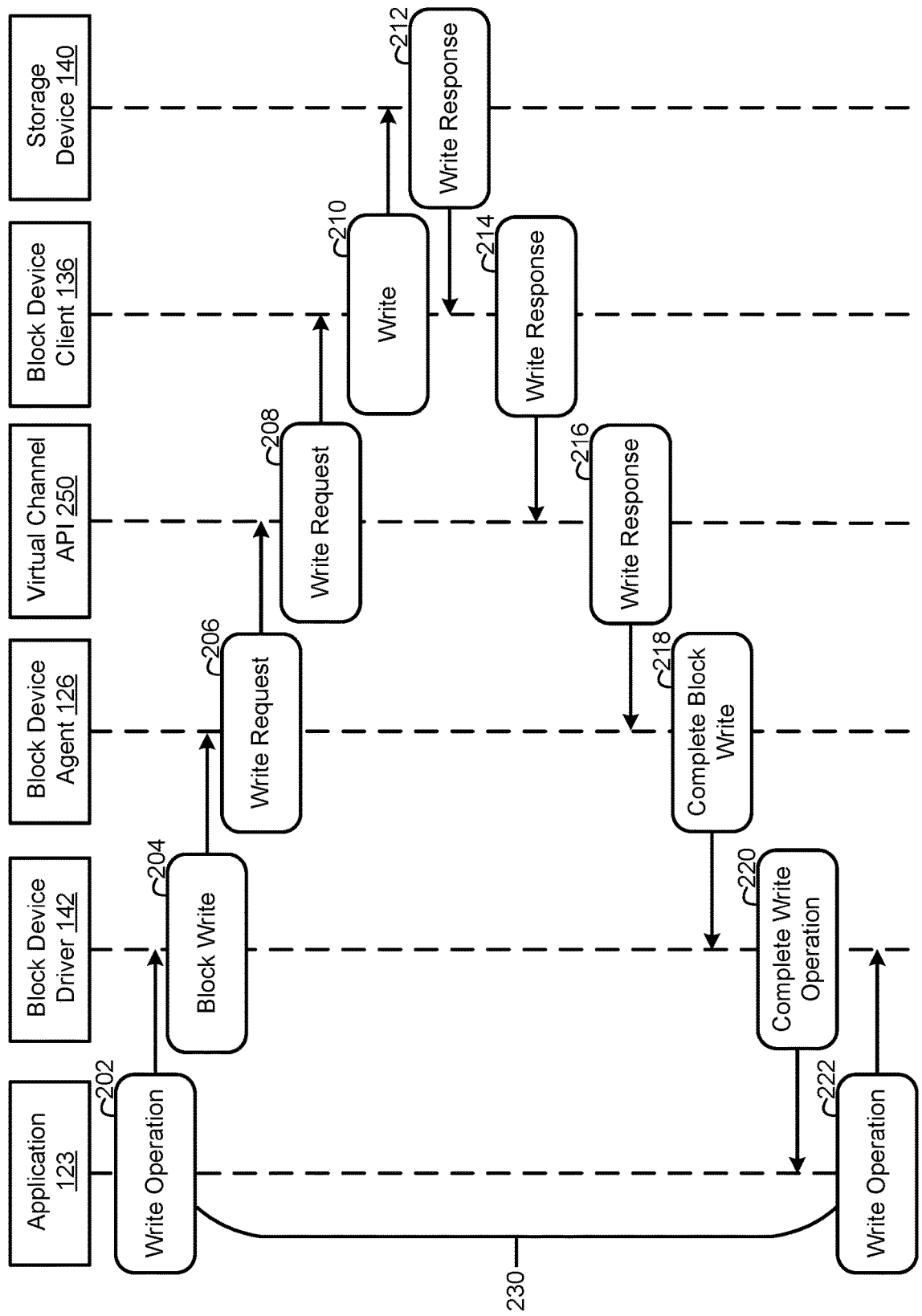
FIG. 2 is an illustration of a first technique for handling storage I/O between a client device and a remote device.

FIG. 2 is an illustration of first technique for handling storage I/O between a client device and a remote device. FIG. 2 includes application 123, block device driver 142, block device agent 126, block device client 136, and storage device 140 of FIG. 1. FIG. 2 further comprises a virtual channel API 250, which generally represents an API on a remote device (e.g., host 105 of FIG. 1) that exposes functions (e.g., methods) for redirecting block-level storage I/O requests from the remote device to a client device (e.g., client device 104 of FIG. 1).

FIG. 2 represents a technique that includes a certain level of inefficiency that is addressed by embodiments of the present disclosure.

At step 202, application 123 sends a write operation to block device driver 142. The write operation may involve writing data to a virtual storage device (e.g., virtual storage device 144 of FIG. 1).

At step 204, block device driver 142 sends a block-level write operation to block device agent 126. At step 206, block device agent 126 sends a request to virtual channel API 250 to send the block-level write operation via a virtual channel (e.g., by calling a function exposed by virtual channel API 250). At step 208, the block-level write request is sent via the virtual channel to block device client 136 in response to the API call from block device agent 126.

At step 210, block device client 136 performs the block-level write operation on storage device 140 and, at step 212, storage device 140 returns a write response confirming that the block-level write operation was completed. At step 214, block device client 136 sends a write response to the virtual channel confirming that the block-level write operation was completed and, at step 216, block device agent 126 receives a write response from the virtual channel confirming that the write response was completed.

At step 218, block device agent 126 sends a response to block device driver 142 indicating that the block-level write operation is complete and, at step 220, block device driver 142 sends a response to application 123 indicating that the block-level write operation is complete.

Application 123 must wait until it receives the response sent at step 220 before it can issue a subsequent write operation at step 222. Thus, the technique depicted in FIG. 2 results in a delay 230 between write operations that is relatively substantial. Delay 230 may be fairly substantial, particularly due to the time associated with transmission of the write request via the virtual channel, processing of the write request on the client device, and transmission of the write response via the virtual channel. As such, FIGS. 3 and 4 depict techniques for improved storage device write performance in remote computing environments.

Figure 3:
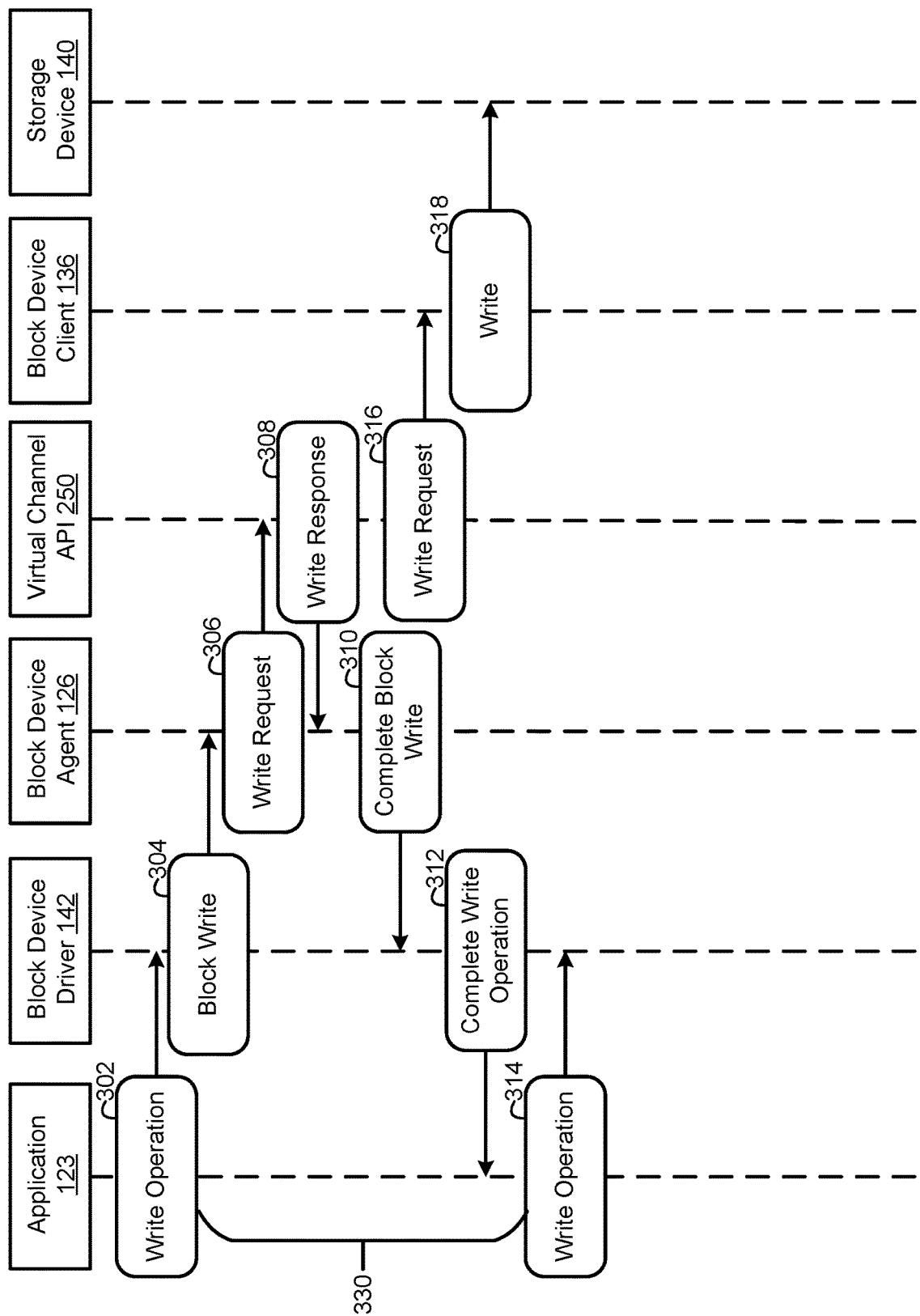
FIG. 3 is an illustration of a second technique for handling storage I/O between a client device and a remote device that improves write performance.

FIG. 3 is an illustration of a second technique for handling storage I/O between a client device and a remote device that improves write performance. The issues described above with respect to FIG. 2 are addressed by techniques described herein, such as with respect to FIG. 3.

At step 302, application 123 sends a write operation to block device driver 142. The write operation may involve writing data to a virtual storage device (e.g., virtual storage device 144 of FIG. 1).

At step 304, block device driver 142 sends a block-level write operation to block device agent 126. At step 306, block device agent 126 sends a request to virtual channel API 250 to send the block-level write operation via a virtual channel (e.g., by calling a function exposed by virtual channel API 250).

At step 308, virtual channel API 250 responds to the request from block device agent 126 with a write response as if a response has been received from block device client 136 indicating that the block-level write operation has been completed. However, at the time virtual channel API 250 responds at step 308, no response has been received from block device client 136. In fact, virtual channel API 250 may not even cause a write request to be sent via the virtual channel to block device client 136 (e.g., step 316) until after responding to block device agent 126 at step 308 (alternatively, step 316 may be performed before or concurrently with step 308).

At step 310, block device agent 126 sends a response to block device driver 142 indicating that the block-level write operation is complete and, at step 220, block device driver 142 sends a response to application 123 indicating that the block-level write operation is complete, all without any confirmation being received from the client device that the write operation was received and/or completed. Upon receiving the response at step 312, application 123 may issue a subsequent write operation at step 314. Thus, the technique depicted in FIG. 3 results in a delay 330 between write operations that may be substantially shorter than delay 230 of FIG. 2, particularly due to avoiding the loss of time associated with transmission of the write request via the virtual channel, processing of the write request on the client device, and transmission of the write response via the virtual channel.

At step 318, block device client 136 performs the block-level write operation on storage device 140. While not shown, responses may still be sent from storage device 140 to block device client 136 and from block device client 136 to the virtual channel, though these responses may be ignored (particularly in cases where no issues occurred in processing the write request). If an issue does occur, block device client 136 may send an error notification to block device agent 126 via the virtual channel, block device agent 126 may notify block device driver 142 of the error, and block device driver 142 may send a request to application 123 to re-send the write operation.

Figure 4:
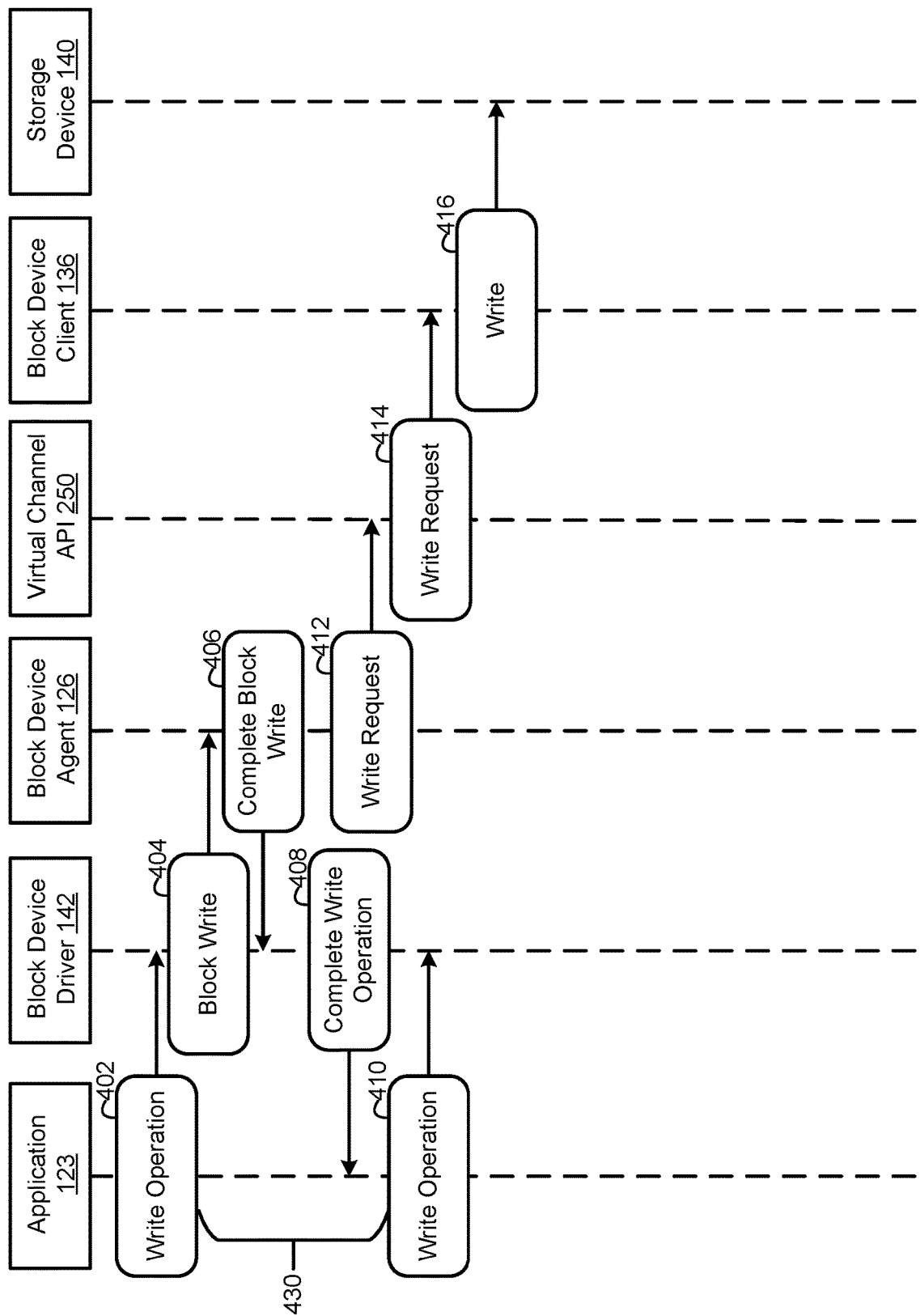
FIG. 4 is an illustration of a third technique for handling storage I/O between a client device and a remote device that further improves write performance.

FIG. 4 is an illustration of a third technique for handling storage I/O between a client device and a remote device that further improves write performance.

At step 402, application 123 sends a write operation to block device driver 142. The write operation may involve writing data to a virtual storage device (e.g., virtual storage device 144 of FIG. 1).

At step 404, block device driver 142 sends a block-level write operation to block device agent 126. At step 406, block device agent 126 sends a response to block device driver 142 indicating that the block-level write operation is complete as if block device agent 126 had received a response from virtual channel API 250 indicating that the block-level write request has been completed. However, at the time block device agent 126 responds at step 406, no response has been received from virtual channel API 250. In fact, block device agent 126 may not even sent a write request to virtual channel API 250 (e.g., step 414) until after responding to block device driver 142 at step 406 (alternatively, step 414 may be performed before or concurrently with step 406).

At step 408, block device driver 142 sends a response to application 123 indicating that the block-level write operation is complete, without any confirmation being received from the client device that the write operation was received and/or completed.

Upon receiving the response at step 408, application 123 may issue a subsequent write operation at step 410. Thus, the technique depicted in FIG. 4 results in a delay 430 between write operations that may be substantially shorter than delay 230 of FIG. 2, and even shorter than delay 330 of FIG. 3.

At step 412, block device agent 126 sends a request to virtual channel API 250 to send the block-level write operation via a virtual channel (e.g., by calling a function exposed by virtual channel API 250) and, at step 414, a write request is sent block device client 136 via the virtual channel based on the API request. At step 416, block device client 136 performs the block-level write operation on storage device 140. While not shown, responses may still be sent from storage device 140 to block device client 136, from block device client 136 to the virtual channel, and from the virtual channel to block device agent 126, though these responses may be ignored (particularly in cases where no issues occurred in processing the write request). If an issue does occur, block device client 136 may send an error notification to block device agent 126 via the virtual channel, block device agent 126 may notify block device driver 142 of the error, and block device driver 142 may send a request to application 123 to re-send the write operation.

It is noted that while the technique depicted in FIG. 4 may be faster than the technique depicted in FIG. 3, it may be advantageous in some cases to use the technique depicted in FIG. 3 rather than that depicted in FIG. 4. For example, the technique depicted in FIG. 4 may potentially put too much stress on the remote device and/or client device due to the fast speed at which write operations can be processed, potentially resulting in overutilization of computing resources. As such, the technique depicted in FIG. 4 may be best suited for cases in which the computing hardware component involved are capable of performing at a high speed.

Figure 5:
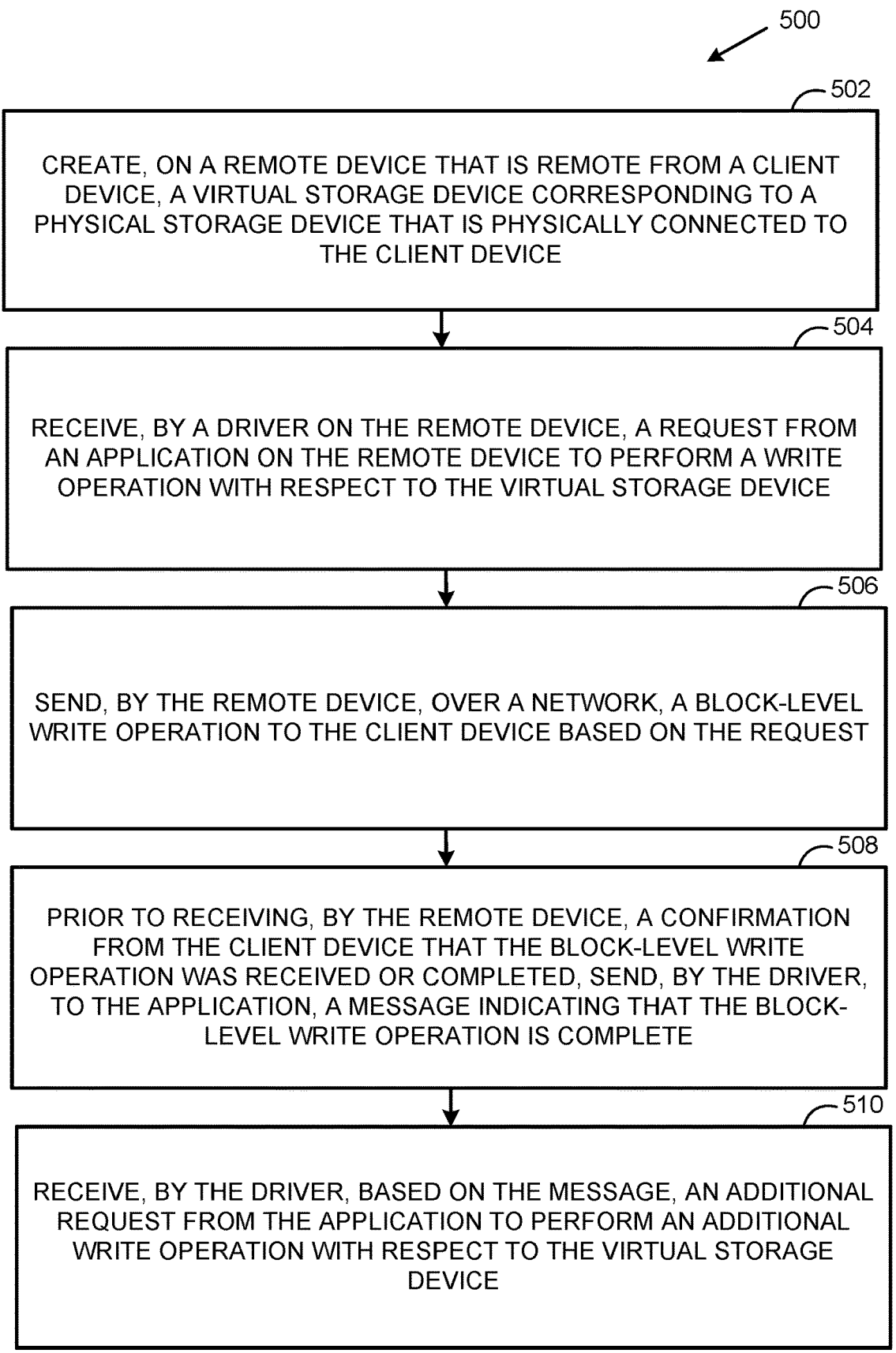
FIG. 5 depicts example operations related to storage write performance improvement in a remote computing environment.

FIG. 5 illustrates example operations 500 related to performance improvement in a remote computing environment. For example, operations 500 may be performed by one or more components of client device 104 and/or host 105 of FIG. 1.

Operations 500 begin at step 502, with creating, on a remote device that is remote from a client device, a virtual storage device corresponding to a physical storage device that is physically connected to the client device. In some embodiments, the physical storage device is a universal serial bus (USB) device connected to the client device. In alternative embodiments, the physical storage device is in physical proximity to the client device and is connected to the client device via a wireless connection.

Operations 500 continue at step 504, with receiving, by a driver on the remote device, a request from an application on the remote device to perform a write operation with respect to the virtual storage device.

Operations 500 continue at step 506, with sending, by the remote device, over a network, a block-level write operation to the client device based on the request.

Operations 500 continue at step 508, with prior to receiving, by the remote device, a confirmation from the client device that the block-level write operation was received or completed, sending, by the driver, to the application, a message indicating that the block-level write operation is complete.

In some embodiments, the driver sends the message based on receiving, from a block device agent on the remote device, a respective message indicating that the block-level write operation is complete. In certain embodiments, the block device agent sends the respective message prior to receiving a response to a call from the block device agent to an application programming interface (API) function for sending the write operation via a virtual channel to the client device. In other embodiments, the block device agent sends the respective message based on receiving a response to a call to an application programming interface (API) function for sending the write operation via a virtual channel to the client device.

Some embodiments further comprise creating the virtual channel between the remote device and the client device. For example, the block-level write operation may be transmitted via the virtual channel based on the call to the API function.

In certain embodiments, the block-level write operation is converted to a USB request block (URB) request on the client device.

Operations 500 continue at step 510, with receiving, by the driver, based on the message, an additional request from the application to perform an additional write operation with respect to the virtual storage device.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments according to the present disclosure may be useful machine operations. In addition, one or more embodiments according to the present disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments according to the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments according to the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers, each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of storage device write performance improvement in a remote computing environment, the method comprising:
   creating, on a remote device that is remote from a client device, a virtual storage device corresponding to a physical storage device that is physically connected to the client device;
   receiving, by a driver on the remote device, a request from an application on the remote device to perform a write operation with respect to the virtual storage device;
   sending, by the remote device, over a network, a block-level write operation to the client device based on the request;
   prior to receiving, by the remote device, a confirmation from the client device that the block-level write operation was received or completed, sending, by the driver, to the application, a message indicating that the block-level write operation is complete; and
   receiving, by the driver, based on the message, an additional request from the application to perform an additional write operation with respect to the virtual storage device.

2. The method of claim 1, wherein the driver sends the message based on receiving, from a block device agent on the remote device, a respective message indicating that the block-level write operation is complete.

3. The method of claim 2, wherein the block device agent sends the respective message prior to receiving a response to a call from the block device agent to an application programming interface (API) function for sending the write operation via a virtual channel to the client device.

4. The method of claim 2, wherein the block device agent sends the respective message based on receiving a response to a call to an application programming interface (API) function for sending the write operation via a virtual channel to the client device.

5. The method of claim 4, further comprising creating the virtual channel between the remote device and the client device, wherein the block-level write operation is transmitted via the virtual channel based on the call to the API function.

6. The method of claim 1, wherein the physical storage device is a universal serial bus (USB) device connected to the client device.

7. The method of claim 6, wherein the block-level write operation is converted to a USB request block (URB) request on the client device.

8. A system for storage device write performance improvement in a remote computing environment, the system comprising:
   at least one memory; and
   at least one processor coupled to the at least one memory, the at least one processor and the at least one memory configured to:
      create, on a remote device that is remote from a client device, a virtual storage device corresponding to a physical storage device that is physically connected to the client device;
      receive, by a driver on the remote device, a request from an application on the remote device to perform a write operation with respect to the virtual storage device;
      send, by the remote device, over a network, a block-level write operation to the client device based on the request;
      prior to receiving, by the remote device, a confirmation from the client device that the block-level write operation was received or completed, send, by the driver, to the application, a message indicating that the block-level write operation is complete; and receive, by the driver, based on the message, an additional request from the application to perform an additional write operation with respect to the virtual storage device.

9. The system of claim 8, wherein the driver sends the message based on receiving, from a block device agent on the remote device, a respective message indicating that the block-level write operation is complete.

10. The system of claim 9, wherein the block device agent sends the respective message prior to receiving a response to a call from the block device agent to an application programming interface (API) function for sending the write operation via a virtual channel to the client device.

11. The system of claim 9, wherein the block device agent sends the respective message based on receiving a response to a call to an application programming interface (API) function for sending the write operation via a virtual channel to the client device.

12. The system of claim 11, wherein the at least one processor and the at least one memory are further configured to create the virtual channel between the remote device and the client device, wherein the block-level write operation is transmitted via the virtual channel based on the call to the API function.

13. The system of claim 8, wherein the physical storage device is a universal serial bus (USB) device connected to the client device.

14. The system of claim 13, wherein the block-level write operation is converted to a USB request block (URB) request on the client device.

15. A non-transitory computer-readable medium storing instructions that, when executed by one or more processors, cause the one or more processors to:

create, on a remote device that is remote from a client device, a virtual storage device corresponding to a physical storage device that is physically connected to the client device;

receive, by a driver on the remote device, a request from an application on the remote device to perform a write operation with respect to the virtual storage device;

send, by the remote device, over a network, a block-level write operation to the client device based on the request;

prior to receiving, by the remote device, a confirmation from the client device that the block-level write operation was received or completed, send, by the driver, to the application, a message indicating that the block-level write operation is complete; and receive, by the driver, based on the message, an additional request from the application to perform an additional write operation with respect to the virtual storage device.

16. The non-transitory computer-readable medium of claim 15, wherein the driver sends the message based on receiving, from a block device agent on the remote device, a respective message indicating that the block-level write operation is complete.

17. The non-transitory computer-readable medium of claim 16, wherein the block device agent sends the respective message prior to receiving a response to a call from the block device agent to an application programming interface (API) function for sending the write operation via a virtual channel to the client device.

18. The non-transitory computer-readable medium of claim 16, wherein the block device agent sends the respective message based on receiving a response to a call to an application programming interface (API) function for sending the write operation via a virtual channel to the client device.

19. The non-transitory computer-readable medium of claim 18, wherein the instructions, when executed by the one or more processors, further cause the one or more processors to create the virtual channel between the remote device and the client device, wherein the block-level write operation is transmitted via the virtual channel based on the call to the API function.

20. The non-transitory computer-readable medium of claim 15, wherein the physical storage device is a universal serial bus (USB) device connected to the client device.

* * * * *